UNITED STATES PATENT OFFICE.

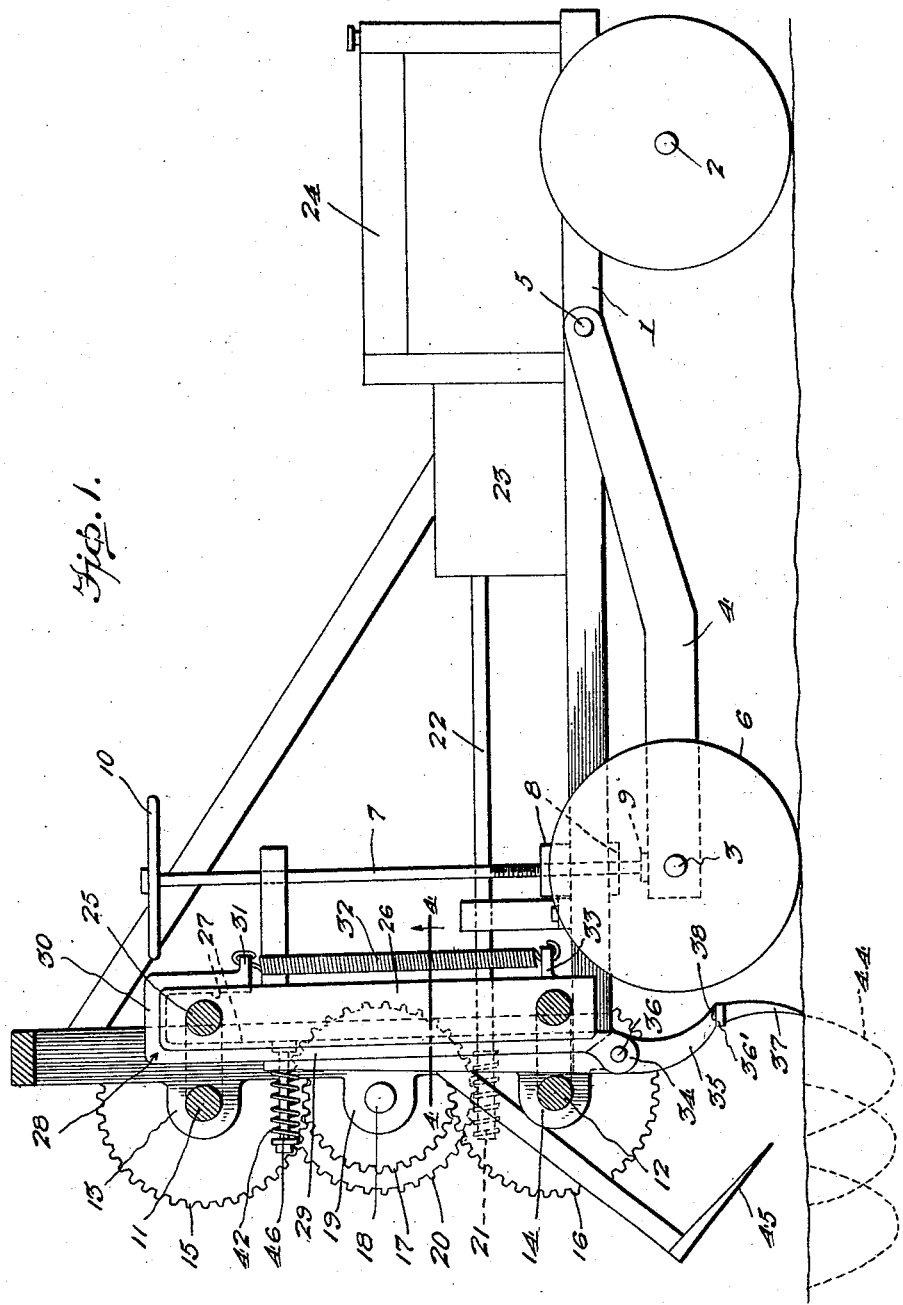

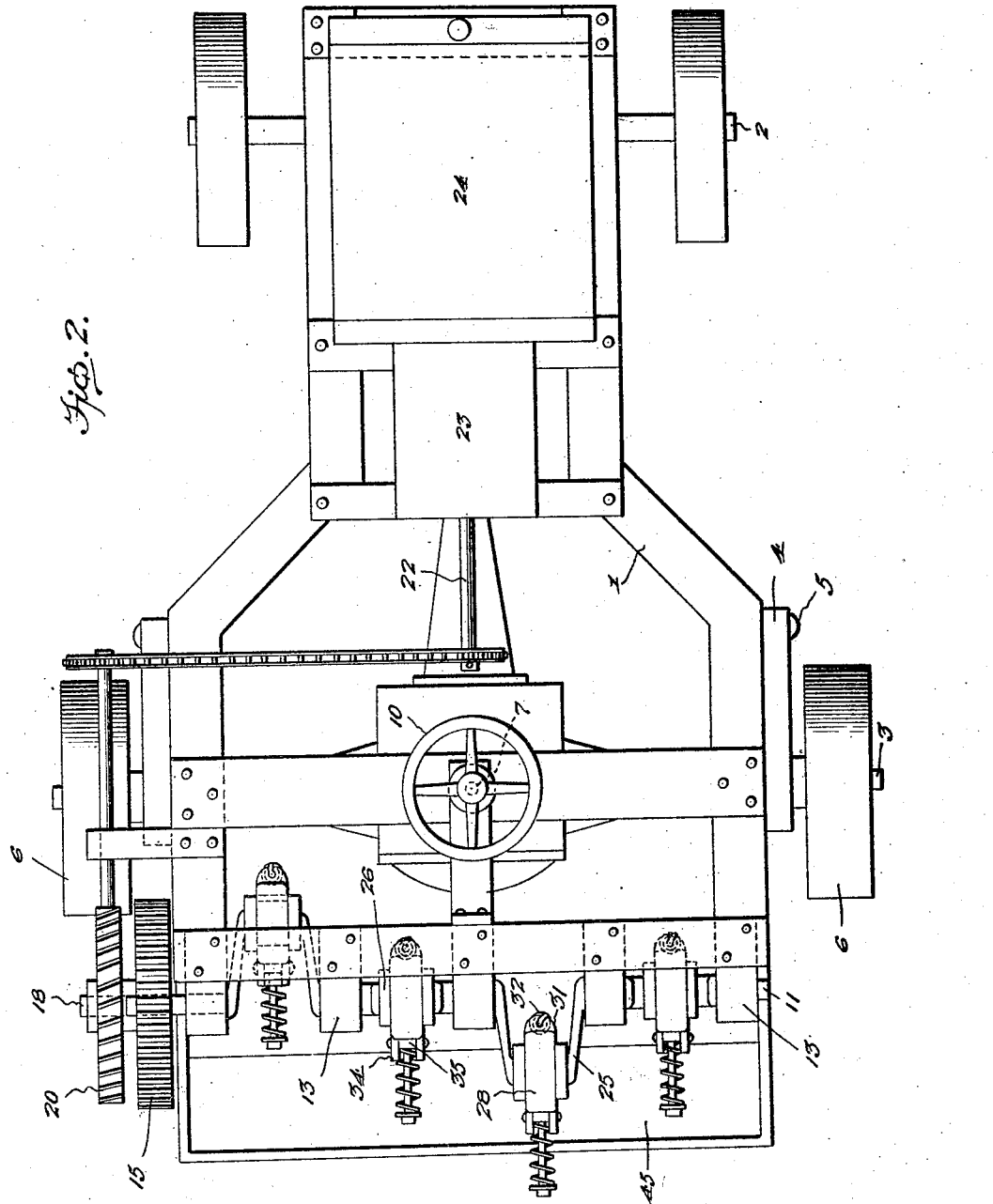

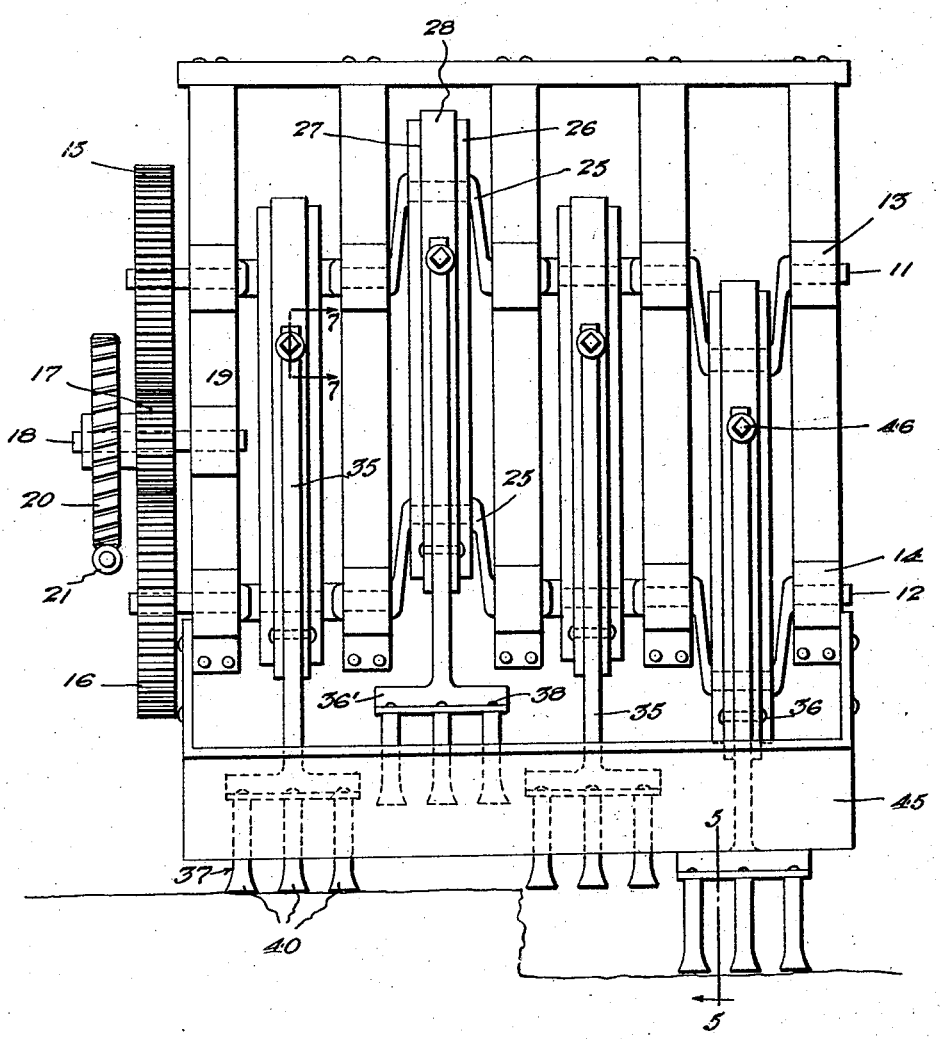

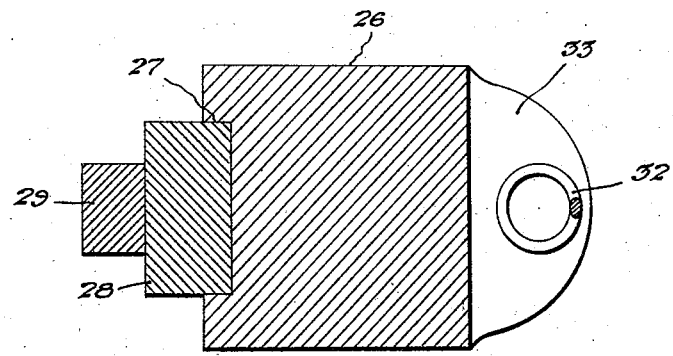
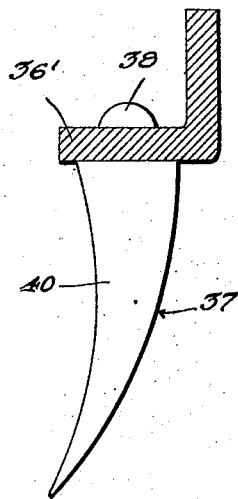
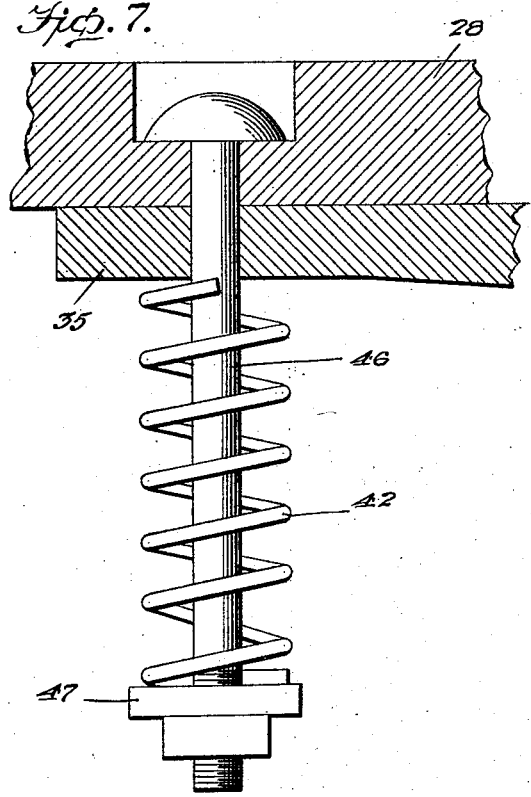
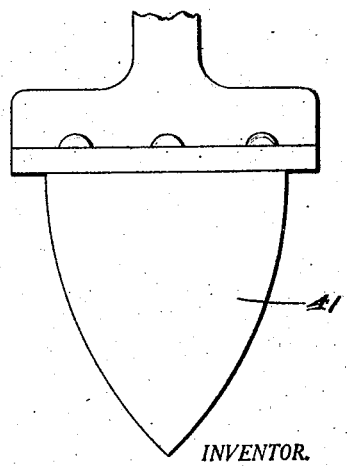
INVENTOR.
Herman Schulze
BY Victor J. Evans
ATTORNEY.

HERMAN SCHULZE, OF NEW BRAUNFELS, TEXAS.

SOIL TILLER.

1,414,308.  Specification of Letters Patent.  Patented Apr. 25, 1922.

Application filed May 10, 1921. Serial No. 468,255.

*To all whom it may concern:*

Be it known that I, HERMAN SCHULZE, a citizen of the United States, residing at New Braunfels, in the county of Comal and State of Texas, have invented new and useful Improvements in Soil Tillers, of which the following is a specification.

This invention relates to earth or soil working implements and an object of the invention is to provide an implement for preparing soil to provide a seed bed and more particularly an implement which will break up or spade up the soil much in the same manner in which it is broken up by an ordinary manually operated fork or spade.

Another object of this invention is to provide a soil working implement which is motor driven and utilizes the power of the propelling motor for operating a plurality of soil working tools which spade up the ground and break it up in preparation of a seed bed.

More specifically the invention comprehends the provision of a soil working implement which comprises a plurality of vertically movable carrying frames which are reciprocated by operation of crank shafts, each of which pivotally carries an implement working arm adapted to move in substantially a U path through the soil to spade it and break it up and also means for yieldably maintaining the reciprocatory frames and both arms in position to permit yielding of these members upon the striking of the earth working tool against an obstruction which would otherwise break the earth working tools.

Other objects of the invention will appear in the following detailed description and in the accompanying drawing wherein:

Fig. 1 is a side elevation of the improved soil tiller.

Fig. 2 is a top plan of the soil tiller.

Fig. 3 is a rear elevation of the soil tiller.

Fig. 4 is a detail cross section taken on the line 4—4 of Fig. 1.

Fig. 5 is a detail section on the line 5—5 of Fig. 3.

Fig. 6 is a detail view of a modified form of the earth working tool.

Fig. 7 is a section on the line 7—7 of Fig. 3.

Referring more particularly to the drawing the improved earth working implement or soil tiller comprises a chassis 1 which is supported by any approved type of front axle 2 and rear axle 3, which latter axle is carried by pivotally mounted side frame members 4. The side frame members 4 are rocked upon their pivots 5 for adjusting the elevation of the rear axle 3 and the supporting wheels 6 carried thereby, by adjustment of a feed screw 7 which threadedly extends through suitable nuts 8 carried by the chassis 1 and which has a head upon its lower end engaging one of the frame members 4 as clearly shown in Fig. 1 of the drawing. A hand wheel 10 of any approved construction may be carried by the upper end of the feed screw 7 to facilitate manual operation or adjustment of the feed screw.

Upper and lower crank shafts 11 and 12 are rotatably supported by suitable bearing members 13 and 14 respectively, they have relatively large gears 15, and 16 mounted thereon respectively with which a pinion 17 meshes. The pinion 17 is mounted upon a stud shaft 18 carried by the frame structure 19 and it carries a worm wear 20 with which a worm 21 meshes. The worm 21 is mounted upon a drive shaft 22 which is connected to an ordinary transmission mechanism indicated at 23, of the implement, which transmission mechanism may be driven from any suitable type of prime mover, such as an internal combustion engine, enclosed within the cowl 24, which motor also is utilized for propelling the implement. It is to be understood that any suitable type of power transmitting mechanism may be utilized in lieu of the worm gear 20 and worm 21 and gears 15, 16 and 17 without departing from the spirit of this invention.

The crank portions 25 of the crank shafts 11 and 12 are connected by bars 26 each of which has its rear edge, upper end, and uppermost portion of its forward edge recessed, as shown at 27, which recessed portions receive therein portions of reciprocatory frames 28 comprising the relatively long vertical sides 29, bight portions 30, and depending relatively short side portions 31 to which contractile spiral springs 32 are connected. The contractile spiral springs 32 are connected to suitable brackets 33 carried near the lower ends of the bars 26 and they yieldably maintain the frames 30 in the recesses 27 formed in the bars 26. Heads 34 are formed upon the lower ends of the relatively long sides 29 of the frames 28 the implement carrying arms 35 are pivotally connected as shown at 36 to the heads 34. The lower ends of the arms 35 are substantially T shaped and providing transverse portions 36' to which the earth working tools 37 are detachably connected as shown at 38. The tools 37 may be composed of a plurality of prongs 40, as shown in Fig. 3 of the drawing, which prongs are curved to present forward convex sides and rearward concave sides, the said convex and concave surfaces merging at the lower ends of the tools into the sharpened edges. If it is so desired, spade like tools, such as illustrated in Fig. 6 of the drawing, comprising a single blade may be used in lieu of the fork type tools, as shown in Fig. 3 of the drawing, or any other approved type of earth working tool may be employed without departing from the spirit of this invention. The arms 35 project above the pivots 36 for the major portion of the length of the sides 29 of the frames 28 and expansible spiral springs 42 are supported and engage the upper ends of these arms for yieldably maintaining the arms against their respective frames 28, however, the springs 42 are adapted to yield to permit yieldable movement of the arm or beam 35 with which they are associated when a solid object is engaged by the tool 37 while passing backwards through the soil and the springs 32 permit yielding movement of the frame 28 relative to its carrying bar 26 when a foreign or solid object is engaged by the tool during its downward motion into the soil, these yieldable break movements preventing breaking of the tools when engaging solid objects during preparation of a seed bed.

During operation, the rotation of the crank shafts 11 and 12 will move the tools 37 downwardly into the ground, rearwardly and upwardly in a substantially U path as shown at 44 in Fig. 1 of the drawing, spading and breaking up the soil as the implement travels thereover. Scrapers 45 are carried by the chassis 1 and are positioned for scraping the concave surfaces of the tools 37 during their upward inactive movement for removing soil therefrom which might adhere to the blades during their spading operation.

The springs 42 are supported by suitable carrying rods 46 which are anchored in the frames 28 and extend through suitable openings in the arms 35, having their inner ends engaging arms 35 while their outer ends engage washers 47 mounted on the rods 46.

The adjustment of the pivoted frame members 4 and consequently of the feed screw 7, the wheel 6 may be operated at such an elevation, relative to the chassis 1, that the tools 37 will not enter the ground or soil at all, such position being desired during transportation of the soil tiller or the implement to and from a field.

It, is of course, to be understood that the invention may be constructed in various other manners and the parts associated in different relations and, therefore, I do not desire to be limited in any other manner except as set forth in the claims hereunto appended.

Having thus described my invention what I claim is:

1. In a soil tiller, a pair of crank shafts, means for rotating said crank shafts, bars connecting said crank shafts, frames slidably supported by said bars, yieldable means maintaining said frames in engagement with said bars and for movement with the bars, and earth working tools carried by said frames.

2. In a soil tiller, a plurality of bars, means for moving said bars, frames slidably supported by said bars, yieldable means maintaining said frames in engagement with said bars for movement with the bars, and earth working tools carried by said frames.

3. In a soil tiller, a bar, means for moving said bar in a substantially oval path, a frame slidably carried by said bar yieldable means maintaining said frame in operative engagement with said bar, an arm pivotally carried by said frame, and an earth working tool carried by said bar.

4. In a soil tiller, a bar, means for moving said bar in substantially oval path, a frame slidably carried by said bar yieldable means maintaining said frame in operative engagement with said bar, an arm pivotally carried by said frame, an earth working tool carried by said bar, and means for yieldably maintaining said arm in engagement with said frame.

5. In a soil tiller, a bar, means for moving said bar in substantially oval path, a frame carried by said bar yieldable means maintaining said frame in operative engagement with said bar, an arm pivotally carried by said frame, an earth working tool carried by said bar, means for yieldably maintaining said arm in engagement with said frame, and a scraper positioned for engaging said earth working tool during a part of its upward movement.

6. In a soil tiller, a pair of crank shafts, means for rotating said crank shafts, bars connecting said crank shafts, frames slidably supported by said bars, yieldable means maintaining said frames in engagement with said bars and for movement with bars, earth working tools carried by said frames, and a scraper positioned for engaging said earth working tools during a part of their movement.

7. In a soil tiller the combination with a motor driven chassis of a pair of crank shafts carried thereby, of a plurality of bars connecting said crank shafts, rotation of said crank shafts adapted to move said bars in a substantially oval path, means operated by said motor for rotating said crank shafts, and frames carried by said bars for limiting yieldable movement relative to the bars at predetermined times, and earth working tools carried by said frames.

8. In a soil tiller the combination with a motor driven chassis, of a plurality of bars carried thereby, means for moving said bars in a substantially oval path, means operated by said motor for operating said bar moving means, frames carried by said bars and movable therewith, said frames mounted for movement relative to said bars, yieldable means maintaining said frames in engagement with said bars, arms pivotally carried by said frames, earth working tools carried by said arms, and yieldable means normally maintaining said arms against movement relative to said frames.

9. In a soil tiller the combination with a motor driven chassis, of a plurality of bars carried thereby, means for moving said bars in a substantially oval path, means operated by said motor for operating said bar moving means, frames carried by said bars and movable therewith, said frames mounted for movement relative to said bars, yieldable means maintaining said frames in engagement with said bars, arms pivotally carried by said frames, earth working tools carried by said arms, yieldable means normally maintaining said arms against movement relative to said frames, and scrapers for engaging said earth working tools during a portion of their movement.

10. In a soil tiller a bar, means for moving said bar in a substantially oval path, a frame slidably carried by said bar, yieldable means maintaining said frame in operative engagement with said bar, an arm pivotally carried by said bar, and yieldable means normally maintaining said arm against movement relative to said frame.

11. In a soil tiller, a pair of crank shafts, means for rotating said crank shafts, bars connecting said crank shafts, frames slidably supported by said bars, glidable means maintaining said frames in engagement with said bars and for movement with the bars, arms pivotally carried by said frames earth working tools carried by said arms, and yieldable means normally maintaining said arms against movement relative to said frames.

In testimony whereof I affix my signature.

HERMAN SCHULZE.